United States Patent

Tohyama et al.

[11] 4,227,811
[45] Oct. 14, 1980

[54] SPECTROPHOTOMETER

[75] Inventors: Shigeo Tohyama; Nobuo Akitomo, both of Katsuta, Japan

[73] Assignee: Hitachi, Ltd., Japan

[21] Appl. No.: 956,238

[22] Filed: Oct. 31, 1978

[30] Foreign Application Priority Data

Nov. 4, 1977 [JP] Japan .............................. 52-132744

[51] Int. Cl.$^2$ .............................................. G01J 3/42
[52] U.S. Cl. .................................... 356/325; 356/319; 356/320
[58] Field of Search ............... 356/308, 309, 319, 320, 356/321, 323, 324, 325, 326, 328

[56] References Cited

U.S. PATENT DOCUMENTS 3,664,744  5/1972  Liston .................................. 356/319

Primary Examiner—Vincent P. McGraw
Attorney, Agent, or Firm—Craig & Antonelli

[57] ABSTRACT

In the double-beam spectrophotometer, two light beams, a reference beam and a sample beam, are used. Optical signals in the light beams are converted into electrical signals. The magnitudes of a reference signal and a sample signal are compared. A voltage to be applied to a photoelectric converting means is adjusted on the basis of the difference signal between the larger signal of the compared signals and a reference voltage so that the magnitude of the larger signal is substantially constant. The spectrum displayed by a recorder is obtained by the ratio of the reference signal to the sample signal. Since the larger signal is controlled to be substantially constant, when the sample signal is larger than the reference signal as in the case of a difference spectrum, the photoelectric converting means is not saturated and a wide photometering range is secured.

4 Claims, 10 Drawing Figures

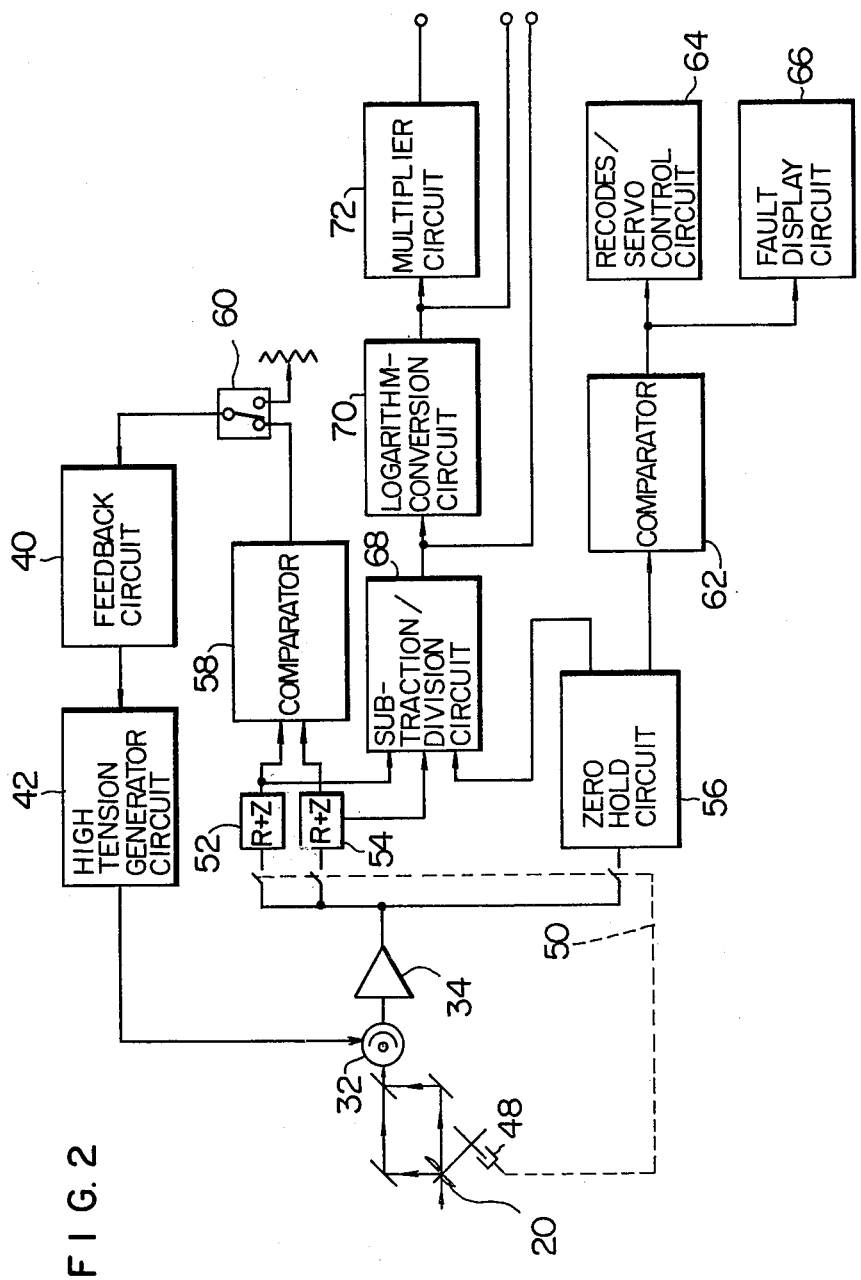

SPECTROPHOTOMETER

BACKGROUND OF THE INVENTION

1. FIELD OF THE INVENTION

The invention relates to a spectrophotometer, particularly double-beam or double-wavelength spectrophotometer.

2. DESCRIPTION OF THE PRIOR ART

A general double-beam spectrophotometer is constructed as follows. Rays of light emitted from a light source is introduced into a monochromator including dispersion elements. With rotation of the dispersion elements, the wave length of the light rays emanating from an exit slit successively changes. The monochromatic light from the monochromator is split into two beams by means of a rotating sector or a beam splitter. One of the beam split is called a reference beam while the other beam called a sample beam. A reference object is placed on the optical path of the reference beam and a sample, on the optical path of the sample beam. These light beams transmitted through the reference object and the sample are converted into corresponding electrical signals, by means of a photoelectric converting means. The electrical signal corresponding to the beam passing through the reference object or material is called a reference signal and the electrical signal corresponding to the beam passing through the sample is called a sample signal. In addition to those signals, a bias signal (usually called a zero signal) such as a signal caused by external light rays and a dark current is included in the output signal of the photoelectric converting means. In the case of the general double-wavelength spectrophotometer, rays of light emitted from a light source is introduced into two monochromators. The monochromatic lights from the monochromators are combined into a single light beam by a sector. The sample is placed on the light beam. The light beam transmitted through the material is converted into electrical signal. In carrying out the measurement, wavelengths of two monochromatic light rays may be fixed at different value, or one of the wavelengths may be fixed at a certain value while the other is scanned. The electric signal corresponding to one of the wavelengths is called a reference signal. The electric signal corresponding to the other is called a sample signal. In an ordinary spectrophotometer, the ratio of the reference signal R to the sample signal S, S/R, is calculated and the calculated one is displayed by a recorder. One of known methods for calculating the ratio feeds back a difference between a reference value and the reference signal R so as to render the reference signal constant. When an object to be under control of a feedback operation is the voltage to be applied to a photomultiplier tube, the method is called a dynode feedback method. When it is the slit width of a monochromator, the method is called a slit servo method.

When the sample signal S is larger than the reference signal R, the sample signal saturates the detector or an amplifier, frequently resulting in failure of the photometory. In this case, it is almost impossible to measure a negative absorbance in particular, and a wide range of photometering is impossible. By the narrow range of photometering, it is difficult to measure a change amount in the difference spectrum measurement. The saturation of the monochromator or the amplifier reduces the life time of the apparatus, or spectrophotometer. The zero signal is superposed on the reference signal R and the sample signal S and under this condition the feedback operation is performed so as to keep only the reference signal R constant. For this reason, with increase of the zero signal Z, the value of the reference signal R detected is smaller than that of the real value thereof. Therefore, the feedback operation is carried out with further increased voltage applied to the photomultiplier or further widened slit width, possibly resulting in uncontrollable running of the apparatus.

SUMMARY OF THE INVENTION

Accordingly, an object of the invention is to provide a double-beam spectrophotometer in which photometering is possible even when a sample signal is larger than a reference signal.

Another object of the invention is to provide a double-beam spectrophotometer with a wide range of photometory.

Still another object of the invention is to provide a double-beam spectrophotometer in which a change amount of material in a difference spectrum measurement may easily be made.

Yet another object of the invention is to provide a double-beam spectrophotometer with a long lifetime.

A further object of the invention is to provide a double-beam spectrophotometer free from an uncontrollable running in the feedback operation.

To achive the above objects of the invention, in the present invention, the larger signal of a reference signal and a sample signal which are delivered from a photoelectric converting means is controlled to be substantially constant and the ratio of both the signals is produced.

BRIEF DESCRIPTION OF THE DRAWINGS

FIG. 2 shows a block diagram of another embodiment of the double-beam spectrophotometer according to the invention;

DETAILED DESCRIPTION OF THE PREFERRED EMBODIMENT

Figure 1:
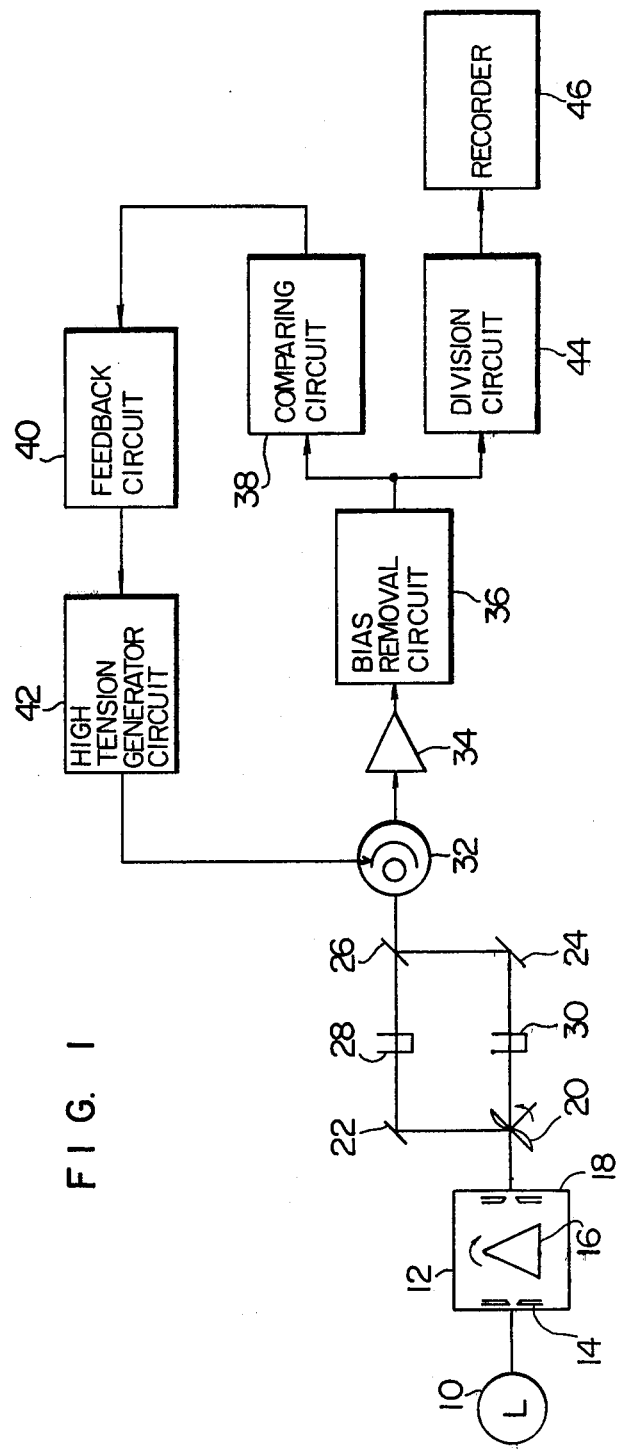
FIG. 1 shows a block diagram of an embodiment of a double-beam spectrophotometer according to the invention.
Figure 3A:
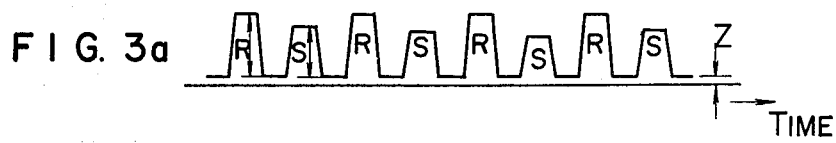
FIGS. 3a–3e a set of waveforms of signals produced from a photoelectric converting means.
Figure 3B:
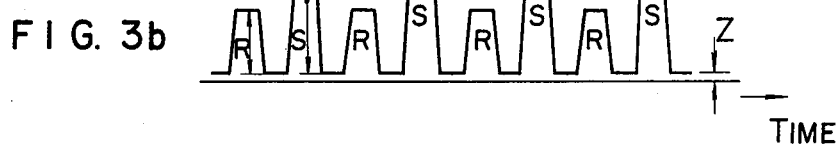
Figure 3C:
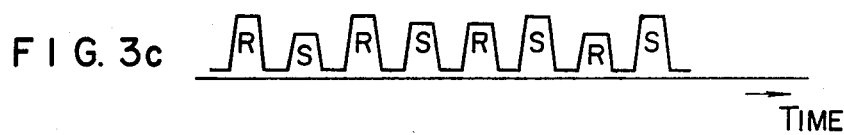

Reference is first made to FIG. 1 illustrating in block form an embodiment of a double-beam spectrophotometer according to the invention. In the figure, reference numeral 10 designates a light source such as a tungsten lamp or deutrium lamp. A monochromator 12 is comprised of an entrance slit 14, a dispersion element 16 such as a prism or a grating, an exit slit 18 and mirrors. Depending on the arrangement of the dispersion element 16, a collimating mirror, and a camera mirror, the monochromater is classified into Littrow type and Ebert type monochromaters. A wave length scanning mechanism generally comprised of a cam or a sine bar is used to change the wavelength of monochromatic light emanating from the exit slit 18. The monochromatic light emitted from the monochromator 12 is split into two beams by means of a rotating sector 20 which is an fan-shaped mirror. Through the rotation of the sector 20, the light beam emitted from the monochromator 12, is split into two light beams. When a mirror lies on the optical path of that light beam, the light beam is reflected by the mirror and is split into two light beams. On the other hand, when no mirror lies on the optical path, the light beam straightforwardly travels through the sector 20. The sector 20 includes an area free from the transmission and reflection of the beam. The sector 20 may be substituted by a fixed beam splitter. The rays reflected by the sector 20 is further reflected by a mirror 22 while the rays passed through the sector 20 is reflected by a mirror 24. Both the light beams from those mirrors 22 and 24 are combined into a single light beam by means of a half mirror 26. Another sector 20 which is the same as the sector 20 and rotates in synchronism with the sector 20 may be used in place of the half mirror 26. As shown, a reference cell 28 and a sample cell 30 are placed on the optical path of the respective light beams or rays. The reference ray and the sample ray which have been bundled into a single light beam, are alternately incident upon a photomultiplier 32 where those are converted into the corresponding electric signals. The optical system ranging from the light source to the detector is known, including other various types of such. For example, the monochromator may be disposed succeeding to the splitter or two detectors may be employed. Either of them is applicable for the optical system. An electric signal produced from the photomultiplier tube 32 is amplified by a preamplifier 34 and is applied to a bias removal circuit 36. The bias removal circuit 36 removes a bias including the dark current arising from the external light or the photomultiplier tube. The waveform of the electric signal produced from the photomultiplier tube 32 is as shown in FIG. 3a. As shown, reference signals and sample signals are alternately disposed having a bias signal Z superposed. The bias signal Z is formed by the area of the sector 20 having no relation with the transmission and reflection of the rays of light. Therefore, the bias removal circuit 36 is comprised of a switch which is turned on and off in synchronism with that area of the sector 20, a hold circuit for holding a signal value when the switch is turned on, and an differential amplifier for operating a difference between the outputs of the hold circuit and the preamplifier 34, and the like. The bias removal circuit 36 removes the bias signal Z superposed on the reference and sample signals R and S, as shown in FIG. 3a. The output from the bias removal circuit 36 is applied to a comparing circuit 38 where the reference signal R is compared in magnitude with the sample signal S and which produces the larger signal of them. More particularly, the reference signal R and the sample signal S are held in the hold circuits by using switches which are turned on and off in the reflecting region of the sector and the transmitting region in synchronism with the rotation of the sector 20. The outputs of the hold circuits are applied as two inputs to the comparator. The comparator judges the magnitudes of the reference and sample signals as input signals relative to a reference voltage thereby to obtain a two value output signal having a positive or a negative value. When the sample signal S is larger than the reference value R, the comparator produces a positive output signal. Conversely, when the former is smaller than the latter, a negative output signal is produced. The two hold circuits are provided at the output sides with switches, respectively. When the output signal of the comparator is positive, the switch provided at the hold circuit for the reference signal R is turned on. On the other hand, when it is negative, the switch at the hold circuit for the sample signal S is turned on through an inverter. In this manner, the relative magnitude of the reference signal R to that of the sample signal S is judged. The output signal of the comparator circuit 38 is applied to a feedback circuit 40 comprising an error amplifier, that is to say, a differential amplifier receiving at the input terminals the output signals of the comparator circuit 38 and the reference voltage. Accordingly, the feedback circuit 40 produces a difference signal between the comparator circuit output and the reference voltage, which in turn is applied to a high tension generator circuit 42 comprising a DC-DC converter. The DC-DC converter usually applies a fixed voltage to the photomultiplier tube 32 and, when receiving the difference signal from the feedback circuit 40, adjusts the fixed voltage in accordance with the difference signal, in order that the larger signal of the reference and sample signals outputted from the photomultiplier tube 32 is restricted to be a fixed value. In case where it is impossible to adopt a diode feedback, that is to say, when a photoconductive cell, for example, is used for the detector, the output signal of the feedback circuit 40 may be used to drive a servo motor thereby changing the slit width. The waveforms of the output signals from the photomultiplier tube 32 which are produced through the above-mentioned control will be described with reference to FIG. 3. The waveforms shown in FIG. 3b are obtained when a conventional method so controlling the reference signal as to be constant is employed. As typically observed in the difference spectrum measurement, when reference signal R is larger than the sample signal S, there is a case where reference signal R increases to exceed the level indicated by a line L. The line L indicates the saturation level of the photomultiplier tube 32 or the preamplifier 34. It is impossible to withdraw a signal exceeding to the level, so that the measurement range of the sample signal is limited below the level indicated by the line L. Generally, the L-line level is double the level of the reference signal R. Accordingly, the minimum range of photometry is −0.3 in terms of absorbance. The upper limit is approximately +2 to +3, although it changes depending on the apparatus used. The waveforms shown in FIG. 3c are depicted when the feedback operation is made by the larger signal of the reference and sample signals. As seen from the figure, the reference signal R is used, at the initial stage, for the feedback operation. Then, the sample signal S is used for the same. The ratio of the reference signal R to the sample signal S is calculated by a division circuit 44, and the result of the division is displayed by a recorder 46. In one form of the division circuit, the reference and sample signals R and S are logarithm-converted and the converted ones are applied to a differential amplifier. Finally, the output signals of the differential amplifier are inversely logarithm-converted. In this example, since the ratio of the reference signal R to the sample signal S is calculated by the division circuit, there is no need for a strict control of the signal by the feedback operation.

As described above, the larger signal of the reference signal and the sample signal is used for the feedback. Accordingly, the larger signal is always restricted to be at a substantially fixed level below the line L, thereby eliminating the failure of photometry. Also with respect to the measuring range, if the maximum absorbance measurable is +3, the minimum absorbance is −3. Further, there is eliminated the saturation of the photomultiplier tube, resulting an elongation of the life-time of the apparatus. The level of feedback may be further closer to the level L, compared to that of the conventional apparatus which is at most half of the level L. Therefore, in the measurement of a high concentration sample i.e., a small sample signal S, a minute sample signal S can be measured to that the measurement accuracy of the high concentration sample is improved.

Turning now to FIG. 2, there is shown in block form another embodiment of the double-beam spectrophotometer according to the invention. In the figure, like symbols are used to designate like portions in FIG. 1. In the apparatus, an output signal from the preamplifier 34 is classified into three signals through the operation of a switch 50. A pick-up 48 is provided to take out a gate signal in phase with the reference signal and the sample signal in synchronism with the rotation of the sector 20. In response to the signal from the pick-up 48, the switch circuit 50 divides the output signal of the amplifier 34 into a sample signal, a reference signal and a bias signal. The pick-up 48 is comprised of, for example, a disc rotating coaxially with the sector 20 and three photocouplers respectively disposed at the both sides of three cut-away portions formed in the disc cut-away portions, which elongate circumferentially with different radiuses, are formed in the disc, corresponding to three areas of the sector 20. Three signal lines from the pick-up 48 connect to the corresponding switch circuits 50, respectively. A reference hold circuit 52, a sample hold circuit 54 and a zero hold circuit 56, when receiving these three signals, measure these signals as R signal+Z signal, S signal+Z signal, and Z signal, respectively. In those signals, R signal+Z signal and S signal+Z signal are compared by the comparator and the larger one is produced therefrom. The circuit construction of the comparator 58 is the same as that of the comparator 38 except that the hold circuit is removed. A switch 60 is used to measure a single beam and, in the measurement, the switch is turned to the right side as viewed in the drawing and keeps constant the voltage to the photomultiplier 32. This signal through the switch 60 is controlled by a feedback circuit 40 so as to always be constant. A high tension generating circuit 42, which receives the constant signal from the feedback circuit 40, supplies a high tension to the photomultiplier tube 2.

The Z signal is always monitored by a comparator 62 as to whether it exceeds a fixed reference value $Z_o$ or not. When it exceeds the reference value $Z_o$, the comparator 62 feeds a signal to a recorder/servo control circuit 64 and a fault display circuit 66 so that the recording is stopped and the fault is displayed.

Figure 3D:
Figure 3E:
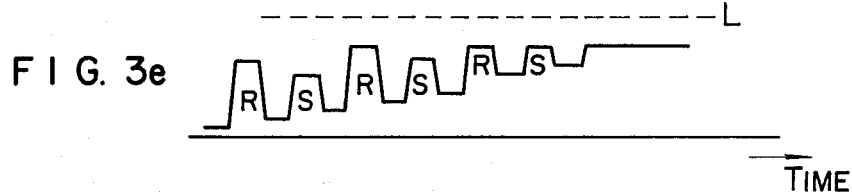

The output signals of the reference hold circuit 52, the sample hold circuit 54, and the zero hold circuit are applied to a substration/division circuit 68 where the ratio S/R is calculated. The subtraction/division circuit 68 is comprised of, for example, a differential amplifier receiving at the two inputs R signal+Z signal and the Z signal and another differential amplifier receiving at the two inputs S signal+Z signal and the Z signal and a division circuit receiving the outputs of these differential amplifiers. The output signal of the subtraction/division circuit 68 is applied as a transmittance to the recorder. The output signal is further applied to a logarithm-conversion circuit 70 and a multiplier circuit 72 with a factor as a multiplier where the output signal is converted into the absorbance and the concentration. These converted ones are displayed as the output of the spectrophotometer. The waveforms produced by the photomultiplier tube 32 will be described with reference to FIG. 3. As observed when a sample room is open, in case where the bias voltage, having no relation with the signal light, increases, that is, when the Z signal is greatly large as shown in FIG. 3d, a conventional circuit controls only the R signal so as to be constant, irrespective of the magnitude of the Z signal. Therefore, when the Z signal greatly grows, there is a case that Z signal+R signal exceeds the level L. If the Z signal+R signal exceeds the level L, the reference hold circuit detects a smaller R signal than a reference value. Therefore, the feedback circuit applies a higher voltage to the photomultiplier 32 so that the Z signal is further closer to the level L. However, when the feedback operation is made by the larger signal of the sample and reference signals, even if the Z signal increases, there is no case where the saturation of the photomultiplier occurs.

Description of the double-beam spectrophotometer of the invention has been made in terms of the circuit; however, the same function may be realized by using a microcomputer.

Figure 4:
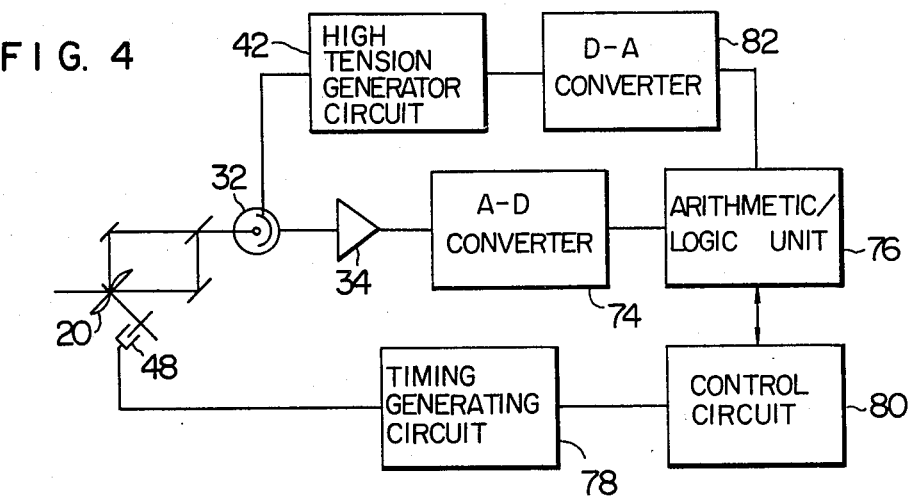
FIG. 4 shows still another embodiment of the invention.

An example when the microcomputer is used is illustrated in FIG. 4 in which like reference numerals are used to designate like portions in FIG. 2. In the figure, reference numeral 74 designates an A-D converter; 76 an arithmetic/logic unit; 78 a timing generating circuit; 80 a control circuit; 82 a D-A converter.

The output signal of the preamplifier 34 is applied to the A-D converter 74 where it is converted into a digital signal which in turn is applied to the arithmetic/logic circuit 76. The signal from the pick-up 48 passes through the timing generating circuit 78 to reach the control circuit 80. The signal transferred by the control circuit 80 to the arithmetic/logic circuit 76 is classified into R signal+Z signal, S signal+Z signal, and Z signal and then these signals are processed as in the case of the FIG. 2 case. The result of the process is converted again by the D-A converter 82 into an analog signal. The analog signal converted drives the high tension generator circuit 42 which in turn applies a high tension to the photomultiplier tube 32.

As described above, in those embodiments, the sample signal including the bias signal and the reference signal are monitored and the photomultiplier tube is controlled by a diode feedback means so that the larger signal of these signals does not exceed a fixed value. Accordingly, even when the sampling signal is larger than the reference signal, there is no saturation of the photomultiplier tube and the preamplifier, unlike the conventional apparatus. Additionally, when a large bias signal is produced as in the case where the sample room is open, the photomultiplier tube and the preamplifier are not saturated since the sample signal including the bias signal and the reference signal are monitored. Therefore, when the sample room is open, the photomultiplier is not subjected to a dangerous condition.

When the sample room is open and an extensive light from exterior irradiates the apparatus, there is a possibility that the measured value is extremely disturbed. For avoiding this, the bias signal is always monitored and when the bias signal exceeds a predetermined value, its dangerous condition is displayed by an alarm lamp or the connection to the recorder or the servo system is interrupted. However, if the apparatus is left for a long time under this dangerous condition, the photomultiplier and the preamplifier are maintained at a safety level.

Figure 5A:
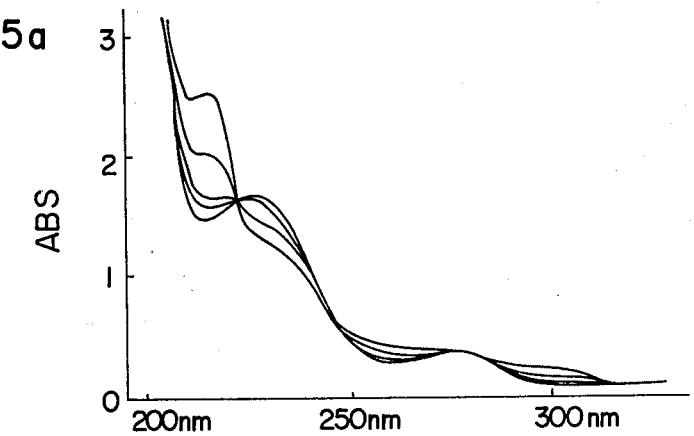
FIGS. 5a and 5b show measuring examples of a difference spectrum.
Figure 5B:
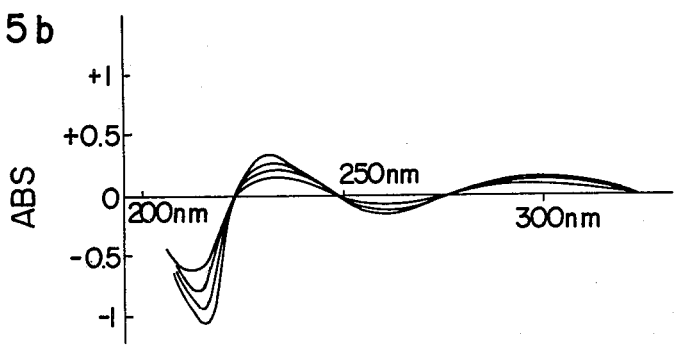

The apparatus according to the invention is well adapted for the difference spectrum measuring and may easily measure a change quantity when material changes. FIGS. 5a and 5b repeatedly plots a process that phthalic anhydride is hydrolyzed into phthalic acid. In the figure, the abscissa represents a wave length and the ordinate an absorbance (ABS). The measuring result by using a conventional apparatus is shown in FIG. 5a. In this case, the measurement of the difference spectrum is difficult and therefore distilled water is used for the reference material. The quantity of phthalic acid changed from phthalic anhydride can not directly be read from the graph. On the other hand, when the apparatus according to the invention is used, if phthalic anhydride is not changed into phthalic acid, the absorbance is zero, i.e. ABS=0 so that the quantity of phthalic acid formed can be directly read in the form of a change amount from the line representing ABS=0.

The embodiments having be described relates to a dynode feedback method. However, the invention is similarly applicable for a slit servo method in which the reference dc signal is compared with a reference voltage by an error amplifier, the output signal of the amplifier drives a servo motor which in turn opens or closes a slit and through this operation the intensity of the reference signal is adjusted. The invention is similarly applicable for the double-wavelength spectrophotometer because of a similarity of a signal processing system between the double-beam and the double-wavelength spectrophotometer.

As described above, the double-beam spectrophotometer according to the invention has a wide dynamic range and is useful in practical use. It is believed, therefore, that the invention greatly contributes to the industry.

We claim:

1. A double-beam spectrophotometer comprising:

photoelectric converting means for converting optical signals into reference and sample electrical signals;

judging means for judging the magnitude of said reference electrical signal relative to said sample electrical signal and producing as an output the larger signal of them;

control means for controlling said larger signal to be substantially constant;

means for interrupting rays of light emitted on at least one material;

means for subtracting a bias signal obtained from said photoelectric converting means at the interruption from said reference and sample electrical signals to obtain subtracted reference and sample electrical signals;

means for operating the ratio of the subtracted two electrical signals; and means for displaying the ratio of said reference and sample electrical signals.

2. A double-beam spectrophotometer according to claim 1, further comprising means which is disposed between said photoelectric converting means and said means for producing said larger signal and subtracts said bias signal from said reference and sample electrical signals generated from said photoelectric converting means, whereby a larger signal selected between said reference and sample electrical signals from which the bias signal is subtracted is controlled so as to be substantially constant.

3. A double-beam spectrophotometer according to claim 1, in which said control means controls a voltage to be applied to said photoelectric converting means on the basis of a difference between the electric signal obtained from said judging means and a reference voltage.

4. A double-beam spectrophotometer according to claim 1, further comprising means for generating a signal when said bias signal is larger than a reference voltage through comparison therebetween.

* * * * *